US010762518B2

(12) United States Patent
Shan

(10) Patent No.: US 10,762,518 B2
(45) Date of Patent: *Sep. 1, 2020

(54) SYSTEM FOR PROVIDING RELEVANT PRODUCTS TO USERS

(71) Applicant: Shutterfly, Inc., Redwood City, CA (US)

(72) Inventor: Ray Shan, San Francisco, CA (US)

(73) Assignee: Shutterfly, LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,772

(22) Filed: Apr. 23, 2019

(65) Prior Publication Data

US 2019/0251582 A1    Aug. 15, 2019

Related U.S. Application Data

(63) Continuation of application No. 14/601,750, filed on Jan. 21, 2015, now Pat. No. 10,318,972.

(60) Provisional application No. 61/942,202, filed on Feb. 20, 2014.

(51) Int. Cl.
  *G06Q 30/02*    (2012.01)

(52) U.S. Cl.
  CPC ..... *G06Q 30/0204* (2013.01); *G06Q 30/0201* (2013.01)

(58) Field of Classification Search
  CPC ......... G06Q 40/00; G06Q 40/06; G06Q 10/00
  USPC ...................................................... 705/7.33
  See application file for complete search history.

(56) References Cited

U.S. PATENT DOCUMENTS

| 7,191,183 | B1* | 3/2007 | Goldstein | G06Q 50/22 707/602 |
| 8,525,839 | B2* | 9/2013 | Chaudhri | G06F 3/0481 345/173 |
| 8,588,076 | B2* | 11/2013 | Allasia | H04L 12/2854 370/236.2 |
| 8,756,092 | B1* | 6/2014 | Marsten | G06Q 10/04 705/7.25 |
| 8,949,876 | B2* | 2/2015 | Ismail | G06Q 10/10 705/26.1 |
| 9,824,117 | B1* | 11/2017 | Adogla | G06F 16/242 |
| 2010/0063860 | A1* | 3/2010 | Gallion | G06Q 10/0633 705/7.27 |
| 2012/0265726 | A1* | 10/2012 | Padmanabhan | G06F 16/214 707/602 |
| 2013/0166515 | A1* | 6/2013 | Kung | G06Q 10/063 707/690 |
| 2013/0325788 | A1* | 12/2013 | Brown | G06F 16/254 707/602 |
| 2014/0279835 | A1* | 9/2014 | Li | G06F 16/215 707/602 |

(Continued)

*Primary Examiner* — Romain Jeanty
(74) *Attorney, Agent, or Firm* — Xin Wen

(57) ABSTRACT

A computer-implemented method for responding to user behaviors includes storing category specifications for a plurality of categories configured to characterize users, storing categories for users in a computer network system, detecting behaviors of a user in real time, and determining in real time if the behaviors of the user is within a first category specification associated with a first category that the user is tagged with. If the behaviors of the user exceed the first category specification, the method assigns a second category to the user in real time in response to the detected user behaviors.

12 Claims, 2 Drawing Sheets

(56) References Cited

U.S. PATENT DOCUMENTS

2017/0277708 A1 9/2017 Sarangi
2017/0277873 A1 9/2017 Bailor

* cited by examiner

SYSTEM FOR PROVIDING RELEVANT PRODUCTS TO USERS

TECHNICAL FIELD

This application relates to technologies that enable electronic commerce, and in particular, to technologies that tracks customer behaviors and customizes marketing and communications based on customer behaviors.

BACKGROUND OF THE INVENTION

Electronic commerce has been responsible for a large portion of economic growth in the last two decades. Customer behavior is an essential part of e-commerce. In recent years, even brick-and-mortar companies have significantly ramped up customer data collection and analyses to improve marketing communications to customers, and for providing the right products to the right customers. A common practice in customer behavior analyses is to segment customers into multiple categories based on customer's shopping behavior, income, gender, geographic locations. Marketing and sales can be tailored to serve different customer segments.

There is a need for more accurately and more timely understand customers' behaviors to guide marketing, and to provide relevant product and services.

SUMMARY OF THE INVENTION

The presently disclosed system and method can accurately track customers' behaviors, and timely respond to changes in customer behaviors than convention systems. The presently disclosed system and method can thus provide improved user satisfaction and increased sales for the product or service providers.

In one aspect, the present application relates to a computer-implemented method for responding to user behaviors. The method includes storing category specifications for a plurality of categories that characterize users; storing categories for users in a computer network system; detecting behaviors of a first user in real time, wherein the first user is tagged with a first category associated with a first category specification; determining, in real time, by a computer processor if the behaviors of the first user exceed the first category specification, if the behaviors of the first user exceed the first category specification, removing association of the first user with the first category from; and assigning a second category to the first user in real time in response to the behaviors of the first user.

Implementations of the system may include one or more of the following. The computer-implemented method can further include determining identities of the first user across multiple systems and platforms, wherein the behaviors of the first user are collected from the multiple systems and platforms in real time. The computer-implemented method can further include joining identities of the first user to form a cross-system, cross-platform, and cross-data-source identifier. The computer-implemented method can further include if the behaviors of the first user are determined to be within the first category specification by the computer processor, keeping the first user associated with the first category. The second category is assigned to the first user if the behaviors of the first user are determined to fall in a second category specification associated with the second category by the computer processor. The first category can be defined by multiple quantitative parameters, wherein the step of detecting behaviors of a first user can include detecting one or more events conducted by the first user, wherein the step of determining can include calculating a probability function of at least the multiple quantitative parameters measured in the one or more events. The category specifications can include limitations along the multiple quantitative parameters, wherein the step of determining comprises calculating a probability function of the multiple quantitative parameters measured in the one or more events and limitations along the multiple quantitative parameters. The computer-implemented method can further include comparing a probability obtained from calculating a probability function to a threshold value to determine if the behaviors of the first user exceed the first category specification. The category specifications can include limitations along the multiple quantitative parameters, wherein the step of determining can include calculating a probability function of the multiple quantitative parameters measured in the one or more events, first limitations along the multiple quantitative parameters for the first category, and second limitations along the multiple quantitative parameters for the second category. The computer-implemented method can further include comparing a probability obtained from calculating a probability function to a threshold value to determine if the first user is to be reassigned to the second category from the first category. The computer-implemented method can further include in response to the assigning of the second category to the first user, adjusting engagement messages from the computer network system to the first user in real time. The step of adjusting engagement messages can include before the step of detecting, associating a first engagement message to the first user, wherein the first engagement message is intended to target users in the first category; and after the step of assigning, associating a second engagement message to the first user, wherein the second engagement message is intended to target users in the second category. The step of detecting behaviors can include obtaining data from a web site operated by the computer network system. The step of detecting behaviors can include obtaining data from a device application provided by the computer network system. The step of detecting behaviors can include obtaining data from a data source external to the computer network system.

These and other aspects, their implementations and other features are described in detail in the drawings, the description and the claims.

DETAILED DESCRIPTION OF THE INVENTION

Figure 1:
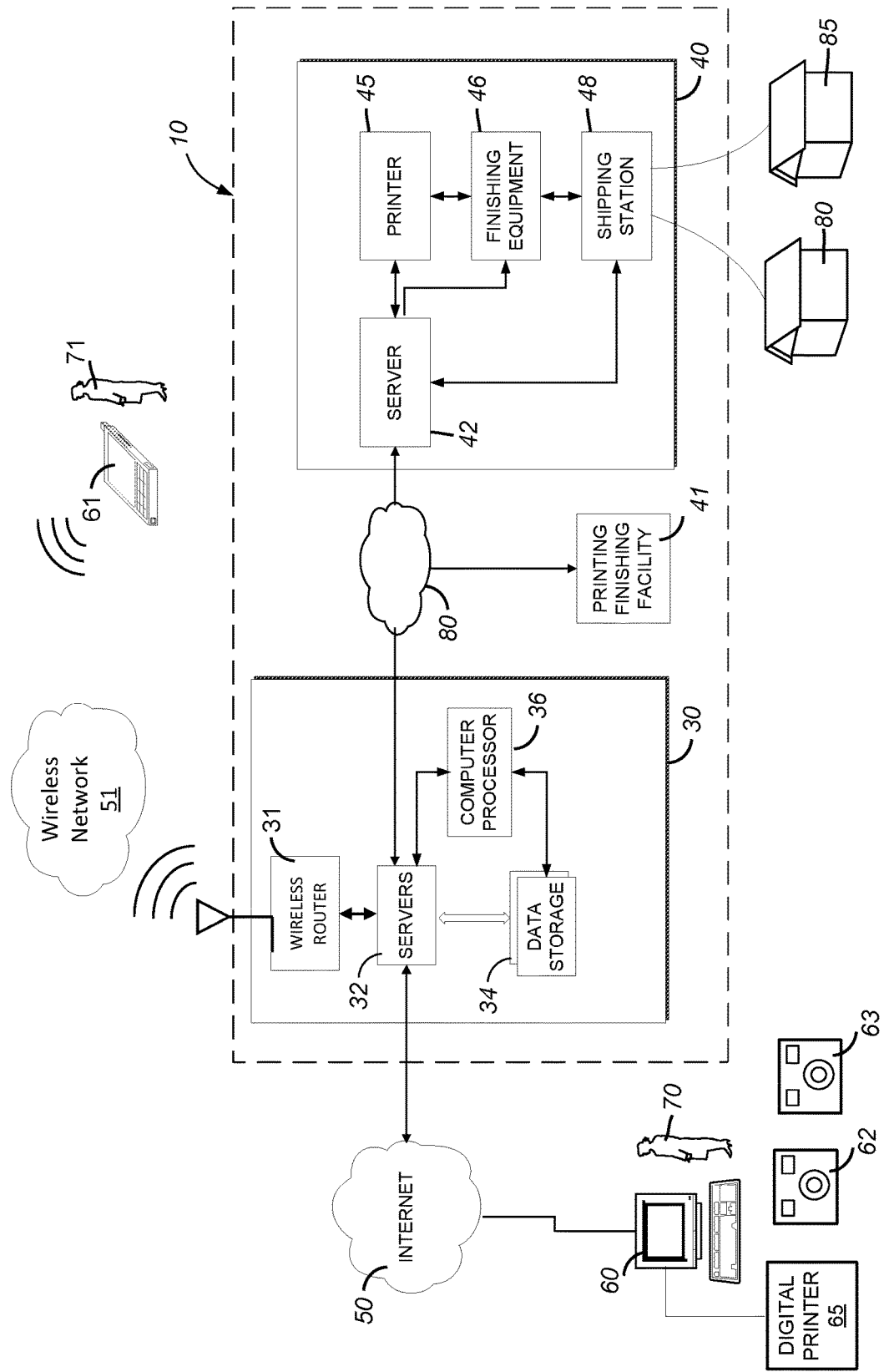
FIG. 1 is a block diagram for an exemplified network-based system for producing personalized image products, image designs, or image projects compatible with the present invention.

Referring to FIG. 1, a network-based imaging service system 10 can enable users 70, 71 to organize and share images via a wired network or a wireless network 51. The network-based imaging service system 10 is operated by an image service provider such as Shutterfly, Inc. The network-based imaging service system 10 can optionally also fulfill image products for the users 70, 71. The network-based imaging service system 10 includes a data center 30, one or more product fulfillment centers 40, 41, and a computer network 80 that facilitates the communications between the data center 30 and the product fulfillment centers 40, 41.

The data center 30 can include one or more servers 32 for communicating with the users 70, 71, a data storage 34 for storing user data, image and design data, and product information, and a computer processor 36 for rendering images and product designs, organizing images, and processing orders. The user data can include account information, discount information, and order information associated with the user. A website can be powered by the servers 32 and can be accessed by the user 70 using a computer device 60 via the Internet 50, or by the user 71 using a wireless device 61 via the wireless network 51.

The network-based imaging service system 10 can provide products that require user participation in designs and personalization. Examples of these products include the personalized image products provided by Shutterfly, Inc. In the present disclosure, the term "personalized" refers to the information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information".

Personalized image products can include users' photos, personalized text, personalized designs, and content licensed from a third party. Examples of personalized image products may include photobooks, personalized greeting cards, photo stationeries, photo or image prints, photo posters, photo banners, photo playing cards, photo T-shirts, photo mugs, photo aprons, photo magnets, photo mouse pads, a phone case, a case for a tablet computer, photo key-chains, photo collectors, photo coasters, photo banners, or other types of photo gift or novelty item. Photobook generally refers to as bound multi-page product that includes at least one image on a book page. Photobooks can include photo albums, scrapbooks, bound photo calendars, or photo snap books, etc. The image products each can include a single page or multiple pages. Each page can include one or more images, text, and design elements. Some of the images may be laid out in an image collage.

The user 70 or her family may own multiple cameras 62, 63. The user 70 transfers images from cameras 62, 63 to the computer device 60. The user 70 can edit, organize images from the cameras 62, 63 on the computer device 60. The computer device 60 can be in many different forms: a personal computer, a laptop, or tablet computer, a mobile phone etc. The camera 62 can include an image capture device integrated in or connected with in the computer device 60. For example, laptop computers or computer monitors can include built-in camera for picture taking. The user 70 can also print pictures using a printer 65 and make image products based on the images from the cameras 62, 63. The cameras 62, 63 can include a digital camera, a camera phone, a video camera capable of taking motion and still images, a laptop computer, or a tablet computer.

The images from the cameras 62, 63 can also be uploaded to the server 32 to allow the user 70 to organize and render images at the web site, share the images with others, and design or order image product using the images from the cameras 62, 63. The wireless device 61 can include a mobile phone, a tablet computer, or a laptop computer, etc. The wireless device 61 can include a built-in camera (e.g. in the case of a camera phone). The pictures taken by the user 71 using the wireless device 61 can be uploaded to the data center 30. If users 70, 71 are members of a family or associated in a group (e.g. a soccer team), the images from the cameras 62, 63 and the mobile device 61 can be grouped together to be incorporated into an image product such as a photobook, or used in a blog page for an event such as a soccer game.

The users 70, 71 can order the making of a physical product based on the design of the image product, which can be fulfilled by the printing and finishing facilities 40 and 41. A recipient can receive the physical product with messages from the users at locations 80, 85. The recipient may also receive a digital version of the design of the image product over the Internet 50 and/or a wireless network 51. For example, the recipient can receive, on her mobile phone, an electronic version of a greeting card signed by handwritten signatures from her family members.

The creation of personalized image products, however, can take considerable amount of time and effort. In some occasions, several people may want to contribute to a common image product. For example, a group of people may want or need to jointly sign their names, and write comments on a get-well card, a baby-shower card, a wedding-gift card. The group of people may be at different locations. In particular, it will be desirable to enable the group of people to quickly write their names and messages in the common image product using mobile devices.

Figure 2:
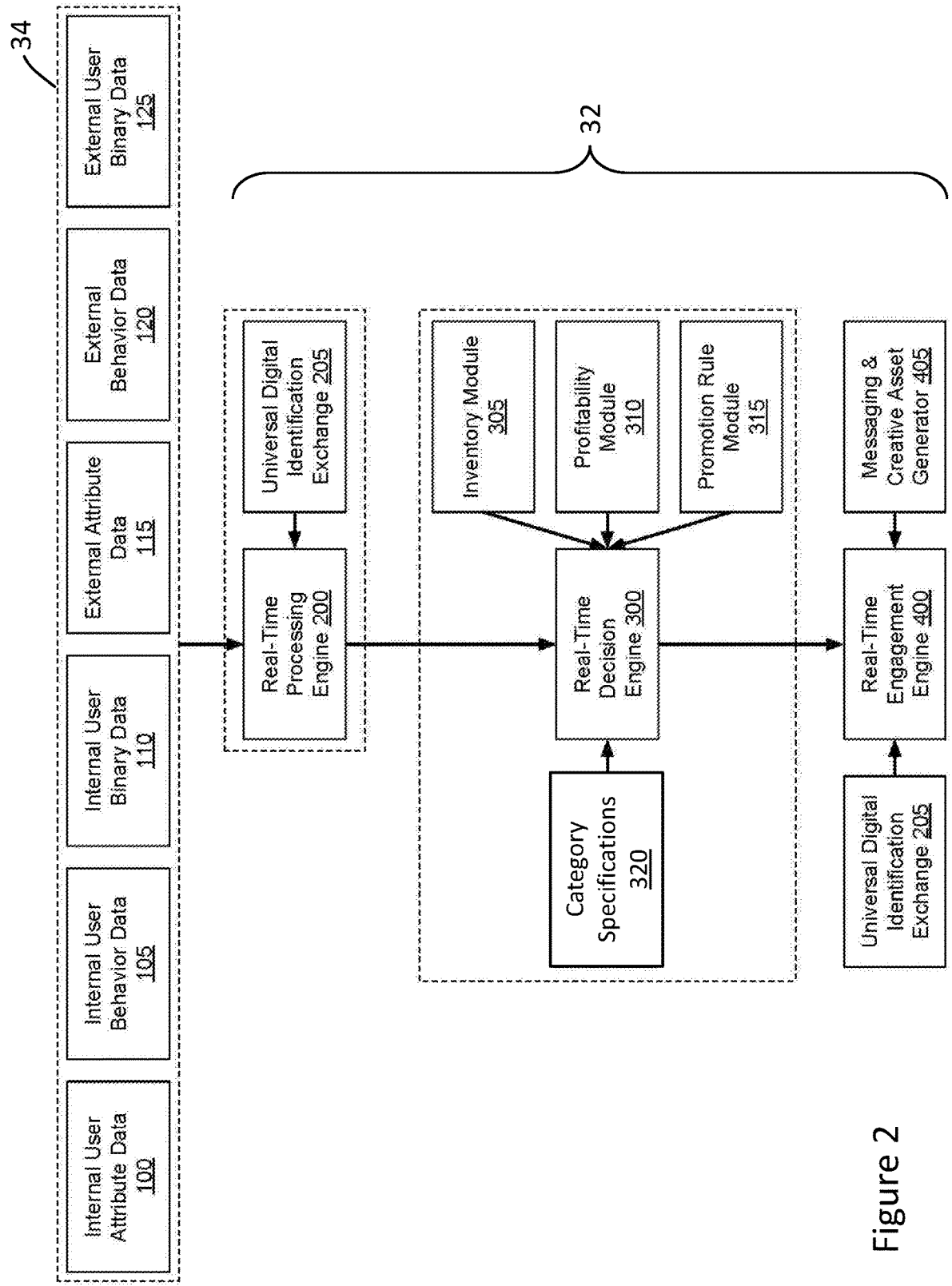
FIG. 2 is a system diagram for a network-based system compatible with the present invention.

In some embodiments, referring to FIGS. 1 and 2, the data storage 34 can store different types of user data, product data, order and sales information, etc., in different format including in databases. The data can be obtained from a website operated by the network-based imaging service system 10 or a device application provided by the network-based imaging service system 10. The data can be obtained from a data source external to the network-based imaging service system 10. For example, the data storage 34 can store internal user attribute data 100 (including user ID, join date, geo location, age, tags or categories that characterize users, etc.), internal user behavior data 105 (including order history, product types ordered, average order value, total purchase value, ordering frequency, saved project history, visit history, browsing habits, etc.), and internal user binary data 110 (including uploaded project photos, videos, etc.). The user attribute data 100 can also include relationships of the user with others, major events in the user's life (birthday, anniversaries, spouse and children's or parents' birthdays, graduation day, etc.), the types of phones or cameras that the user uses, income level, user's interests and hobbies, and club, sports, and professional affiliations, etc.).

The data storage 34 can also store external attribute data 115 (including credit, demographics, geographic information, etc.), external behavior data 120 (including communication history on social media websites, cross-website purchase history, interests previously expressed), and external user binary data 125 (including uploaded photos to social media websites). Data at the external data sources (115-125) can be programmatically obtained by from partners, vendors or public data sources by accessing their APIs, or scraping.

The servers 32 (or a computer processor) can power a real-time processing engine 200 to collect a non-stop, continuous data stream from the above described internal data sources (100-110), and external data sources (115-125). The real-time processing engine 200 can be in communication with a universal digital identification exchange 205 to determine identities of a user and his or her behaviors across multiple systems and platforms. The universal digital identification exchange 205 can map and join identities of the user or a cohort of users via a cross-system, cross-platform, and cross-data-source identifier, e.g. cookie, mobile device IMEI, behavior pattern, etc. For newly joined users, external data are accessed and processed as soon as user identification (cookie, email, etc.) is provided. The real-time processing engine 200 can collect user behaviors from multiple systems and platforms in real time. A profile for decision/targeting can be built before the user has even used the services in the network-based imaging service system 10.

New users are categorized as they join by a cohort definition, using external data if ID matching is available. Existing users' categories are updated in real time based on changes detected by real time processing engine 200. For example, depending on their product ordering histories, users can be categorized as low, mid, and high value customers. Users can also be categorized by the products and services they are interested in, for example, greeting card user, photobook user, or a combination of product categories. The categories are used to determine the type of promotions to be sent to each category of users by real-time decision engine 300. For example, higher priced photobooks and mobile phone cases may be promoted to the high value users. Photobook sales may be communicated to photobook users.

The processed streaming data is sent to a real-time decision engine 300. Non-streaming data is polled from sources and processed periodically.

In according to the present invention, users can be re-categorized in real time in response to their current behavior, in comparison to their existing categories. A category specification module 320 stores specification parameters for the user categories. For example, a low value user can be defined by average order value below $15. A mid value user can be defined by average order value from $15 to below $25. A high value user can be defined by average order value at $25 and above. The ordering of a photobook from one user qualifies that user with a photobook user tag. One user can be tagged by multiple tags: for example, a user can be simultaneously a high value user and a photobook user.

When user behavioral data is received by the real-time decision engine 300, the real-time decision engine 300 retrieves the user identification (which includes a cross-system, cross-platform, and cross-data-source identifier) involved in the incoming user data, and the categorizations of the users from the internal user behavior data 105 or the external behavior data 120. The real-time decision engine 300 compares the new user behavioral data with the category specifications 320 to determine if the user behaviors fall within or go beyond the specifications of categories that are currently associated with the user. For instance, if a mid-value user suddenly purchases a $100 photobook, the user's average order price is significantly increased to above $25, that user can be re-categorized in real time as a high-value user. The tagging of mid-value category is removed from associating with the user. The user's new category or tag is saved instantly in the internal user behavior data 105 or the external behavior data 120. If a user, who has never purchased a photobook, is detected as to purchasing her first photobook, the user is categorized with photobook user and the tag is saved in real time. If the new user behavior does not exceed her existing categories or tags, her categories or tags are not changed.

In some embodiments, the real-time decision engine 300 evaluates two or more user behavioral events to determine if the user should be re-categorized with a new category or changed from an existing category to a new one. In one aspect, considering multiple user behavioral events can reduce the chance of giving too much weight to a one-time user behavior. It is more likely to discovery a real pattern in the user's future behaviors.

For example, a category specification is defined by a parameter X, X can be price, number of products per order, number of orders in a period, types of products, type of shipping, etc. A user is currently assigned in a first category that is defined by a range [X1, X2]. A second category is defined [X3, X4]. For adjacent categories, X2 can be equal to X3. New user behaviors in events a and b can be quantified as Xa and Xb. In general, the probability P to change the user's category from the first to the second one can be represented as:

$$P = f(X1, X2, X3, X4, Xa, Xb) \qquad \text{Eqn. (1)}$$

The probability P calculated can be compared to a predetermined threshold value P12, which sets the minimum probability required for hopping from the first category to the second category.

The same probability approach can be extended to more events (a, b, c . . . ) and multiple dimensions (X, Y, Z . . . ), wherein each of X, Y, Z represents a quantitative parameter such as price, number of products per order, number of orders in a period, types of products, type of shipping, etc. In the Y dimension, the first category can be limited a range [Y1, Y2]. A second category is defined [Y3, Y4]. In general, user categories can be defined in a volume or manifold in a multi-dimensional space:

$$P = f(X1, X2, X3, X4, Xa, Xb, Xc; Y1, Y2, Y3, Y4, Ya, Yb, Yc) \qquad \text{Eqn. (2)}$$

In some embodiments, fuzzy logic can be used to determine category hopping from one current category to one or more potential categories. The hopping is determined not strictly by whether a user-initiated event a, b, c produces category specification within or outside a range (e.g. [X1, X2], [X3, X4], [Y1, Y2], [Y3, Y4], etc.), rather by a probability distribution in the multi-dimensional space (defined by the multiple dimensions). The category hoping is determined by how much deviation of the user behavior from a first category to the second category by weighing deviations along all the dimensions of the category specifications. The probability P calculated can be compared to a predetermined threshold value $P_{12}$ to determine if a category hop should occur or not.

The servers 32 can also be installed with an inventory module 305 that analyzes inventory levels and matches with possible promotions and complementary products for all or specific categories of users, e.g. free iPhone case with iPad case purchase for high-value customers. In addition, a profitability module 310 calculates thresholds for promotions for users in different categories, e.g. offer free gifts with purchase until margin & forecasted user cohort's return on investment metrics drops below threshold. Moreover, a promotion rule module 315 generates new, unique promotions for users, based on their categories, by analyzing current promotional activities, price table, and upcoming buyouts with large impacts (e.g. direct mail buyout).

Once users' categories are re-evaluated and possibly re-categorized using new user behavior data, the real-time decision engine 300 can develop marketing strategies using the newly obtained user category information under the guidance of the inventory module 305, the profitability module 310, and the promotion rule module 315. Examples of the real-time decision engine 300's outputs include: the most likely product to be purchased by one user or a cohort of users; the most likely promotion that will drive a purchase behavior change of one user or a cohort of users; fire sale of excess inventory to a cohort of users with least negative financial impact.

Taking the output from the real-time decision engine 300, a real-time engagement engine 400 can instantly change the engagement with the relevant users. The real-time engagement engine 400 identifies what to target the cohort of users with (promotional offer or product), where and how to target them (online media properties, e.g. a mother blog for mother audience; geographical location, e.g. a radio advertisement in San Francisco if an entire geographical location is under targeted, etc.). A universal digital identification exchange 205 can find external identities of users so each can be uniquely targeted. A messaging & creative asset generator 405 produces personalized creative assets (images, videos, sound) that are most likely to be responded by the cohort of users identified by real-time decision engine 300.

It should be noted that the conventional user analyses systems are designed to categorize users under a regular schedule, such as every 6 months. One drawback of such a system is that even after a user behavior has changed for a while (sometimes a long time), the marketing engagement is still based on the old user behavior.

The presently disclosed system and method thus can accurately track customers' behaviors and respond to changes in customer behaviors much timelier than convention systems, which can provide improved user satisfaction and increased sales for the network-based system.

It should be understood that the presently disclosed systems and methods can be compatible with different devices and image products or applications other than the examples described above. The network-based system can be implemented with different hardware or software configurations without deviating from the spirit of the present invention. User behaviors, product types, user categories, and category specifications are not limited to the described examples while still compatible with the disclosed invention.

What is claimed is:

1. A system for providing relevant products to users, comprising:
   a data storage configured to store a first category bound by a first numeric range in a data structure, wherein the first numeric range is defined by a first limit and a second limit, wherein a first user is tagged with the first category,
   wherein the data storage is configured to store a second category bound by a second numeric range in the data structure, wherein the second numeric range is defined by at least a third limit, wherein the second numeric range is different from the first numeric range;
   one or more computer processors configured to automatically detect in real time an action of the first user associated with the second numeric range,
      wherein the one or more computer processors are configured to automatically calculate a probabilistic function in real time in part based on the action of the first user, which produces a probability, wherein the probabilistic function is at least dependent on the first limit, the second limit, the third limit,
      wherein the one or more computer processors are configured to automatically determining if the probability is above a threshold value, and if the probability is above a threshold value, to automatically tag the first user with the second category; and
   a manufacturing facility configured to produce a personalized product for the first user in accordance with the second category.

2. The system of claim 1, wherein the manufacturing facility includes a printer configured to print the personalized product for the first user in accordance with the second category.

3. The system of claim 1, wherein the manufacturing facility includes a finishing equipment configured to finish the personalized product.

4. The system of claim 1, wherein the second numeric range is further defined by a fourth limit.

5. The system of claim 4, wherein the action of the first user is quantified by a value between the third limit and the fourth limit.

6. The system of claim 1, wherein the first numeric range and the second numeric range are respectively characterized in multiple dimensions.

7. The system of claim 1, wherein the first numeric range is defined by more than two limits, wherein the second numeric range is defined by more than two limits.

8. The system of claim 1, wherein the first numeric range and the second numeric range are not overlapping with each other.

9. The system of claim 1, wherein the action of the first user is detected in an external data source.

10. The system of claim 1, wherein the action of the first user is detected from multiple platforms.

11. The system of claim 10, wherein identities of the first user from the multiple platforms are joined.

12. The system of claim 1, further comprising:
   a computer server configured to send the first user a message associated with the second category in response to the step of automatically assigning the first user to be tagged with the second category.

* * * * *